United States Patent [19]
Kimble

[11] Patent Number: 5,411,253
[45] Date of Patent: May 2, 1995

[54] PUTTING TRAINING METHOD

[76] Inventor: Robert L. Kimble, 2935 Sope Creek Dr., Marietta, Ga. 30068

[21] Appl. No.: 259,443

[22] Filed: Jun. 14, 1994

[51] Int. Cl.⁶ .............................................. A63B 69/36
[52] U.S. Cl. .................................. 273/32 H; 33/365; 434/153
[58] Field of Search ................. 273/32 H, 32 R, 32 B; 33/365; 434/153, 252

[56] References Cited

U.S. PATENT DOCUMENTS

| | | | |
|---|---|---|---|
| 996,106 | 6/1911 | Means | 33/365 |
| 1,206,593 | 11/1916 | Reed | 33/365 |
| 3,923,000 | 12/1975 | Cloyd | 116/124 R |
| 4,482,155 | 11/1984 | Higley | 273/32 H |
| 4,514,908 | 5/1985 | Yamaguchi | 33/365 |
| 4,603,484 | 8/1986 | Strothmann | 33/366 |
| 4,984,791 | 1/1991 | Labell | 273/32 H |
| 4,989,334 | 2/1991 | DuBose, Jr. | 33/365 |
| 5,184,817 | 2/1993 | Kanelous | 273/32 H |

Primary Examiner—George J. Marlo
Attorney, Agent, or Firm—Louis T. Isaf; Jeffrey R. Koester

[57] ABSTRACT

A base with a referenced concave surface and a movable indicator form a putting aid which indicates direction and amount of slope on a golf green. Diametrically opposed sighting rods provide convenient and accurate visual alignment while the putting aid is situated down upon the golf green. Arrowheaded linear, transverse linear and concentric circular indicia located upon the concave surface serve as reference markings. A first method of operation includes facilitating the training of a golfer to putt a golf ball into a golf hole by aligning the putting aid between the golf ball and the golf hole such that the sighting rods and arrow indicium are aligned with an imaginary direct line between the golf club and the golf hole. A second method includes facilitating the training of a golfer to correctly perceive slope by placing the base upon the ground at a test location while rotating the putting aid to align the sighting rods and arrow indicium with a perceived downhill direction before the movable indicator is released to move about the concave surface and indicate actual direction and amount of slope. A third method includes facilitating the mapping of slopes on a sloped green by observing relationships between the movable indicator, the reference indicia, and physical reference objects around the green.

11 Claims, 5 Drawing Sheets

PUTTING TRAINING METHOD

BACKGROUND OF THE INVENTION

The present invention relates generally to the field of golf, and more specifically to the field of facilitating improvement in putting a golf ball on a sloped golf green.

Without a doubt, many golfers have experienced the frustration of hitting promising long shots to quickly place a golf ball on a golf green before unfortunately needing to take four, five or more putts on the golf green to place the golf ball in the golf hole. A golfer's ability to putt accurately is one of the most important aspects of the sport of golfing. One reason the act of putting presents such great difficulty to so many golfers is the varying slopes of golf green playing surfaces. Golfers are notoriously unable to accurately judge the actual direction and amount of slope on a golf green between a resting golf ball and a golf hole.

In the past, efforts have been made to address this well-known problem. Devices have been provided for assisting golfers in estimating the general direction and amount of slope toward a golf hole. Such devices have included variously-constructed levels positioned in handheld devices, in putters themselves, and even in eyeglass frames. Many of these prior devices are patented and described or referenced in U.S. Pat. No. 4,984,791.

While each of those devices address the issue of varying slopes on a golf green, none of them provide a simple, inexpensive, accurate and effective method of addressing the above issue and many of the related problems. For example, many of the devices are prone to inaccuracy since they are designed to be operated while being held in a golfer's relatively-positioned and unstable hand. In addition, many of the prior devices include bubble levels which are, to some, inherently "backwards", in that the bubble position indicates the opposite direction in which the ground slopes. Moreover, the recommended methods of utilizing many of the prior devices are particularly cumbersome multi-step methods which are difficult to convey and understand.

The present invention is directed toward the need for an apparatus and methods for addressing these and other related, and unrelated, problems.

SUMMARY OF THE INVENTION

Briefly described, the present invention includes, in accordance with a preferred embodiment, a putting aid including a base and a movable indicator in the form of a spherical ball. The base includes a circular rim peripherally bounding a central portion with a concave surface to define a concave cavity. The base also includes a pair of references in the form of sighting rods extending in parallel upward and away from opposing sides of the rim. In addition, the base includes a plurality of reference indicia located upon the concave surface, including a plurality of concentric circles centered upon a bottom point of the concave surface, a linear arrow indicium pointing from one sighting rod to the other and extending across the concave surface through the concave surface bottom point, and a plurality of parallel linear indicia extending across the concave surface transverse to the linear arrow indicium.

The present invention also includes a variety of methods associated with the putting aid. One preferred method includes utilizing the putting aid to facilitate the training of a golfer to putt a golf ball into a golf hole on a sloped green. This first method includes placing the putting aid upon the ground along an imaginary line between a resting golf ball and the golf hole. During such placement, the putting aid is oriented with the arrow indicium pointing toward the golf hole. Conveniently, the sighting rods assist the golfer in properly aligning the putting aid. The movable indicator is allowed to roll upon the concave surface in response to gravity so that the resting place of the movable indicator can be compared by the golfer to the reference indicia upon the concave surface. Such comparisons will indicate the actual direction and amount of the slope of the golf green at a point between the golf ball and the golf hole, thus assisting the golfer in being better able to determine the correct swing characteristics of a putt which would place the golf ball into the golf hole.

A second preferred method of the present invention includes facilitating the training of a golfer to correctly perceive slope at a test location upon a sloped green. According to this second preferred method of the present invention, the golfer first places the putting aid upon the ground at a test location while rotating the putting aid to align the sighting rods and arrow indicium with a perceived downhill direction. During placement of the putting aid, the movable indicator is restrained, or held separate from the base. Subsequently, the movable indicator is released to move about the concave surface and indicate an actual downhill direction and amount of slope relative to the reference indicia. The angle between the arrow indicium and a line between the movable indicator and the center of the concave surface indicates how far the perceived downhill direction is angled away from the actual downhill direction.

A third method of the present invention includes facilitating the mapping of slopes on a sloped green. The method includes first determining a variety of sample locations upon a green and then performing the following steps at each location. With optional reference to physical objects around the green, such as a particular tree, sprinkler, or bunker, the putting aid is placed down upon the green at a sample location, and the movable indicator is allowed to move about the base. The relationships between the resting location of the movable indicator, the reference indicia, and any chosen physical objects around the green are then observable for determining and recording upon an outline of the green the amount and direction of slope at that sample location.

The present invention also includes a variety of alternate embodiments of the putting aid. Unlike the putting aid of the preferred embodiment of the present invention where the sighting rods and base form a unitary structure, alternate embodiments of the present invention include putting aids with alternately connected sighting rods, including readily removable sighting rods and hingeably connected sighting rods. In addition, a retention cavity is defined for storing the movable indicator.

It is, therefore, an object of the present invention to provide a new putting aid and new methods for utilizing such a device.

Another object of the present invention is to provide a putting aid and methods of operation which are easy, convenient, accurate, inexpensive, and effective.

Yet another object of the present invention is to provide a putting aid which accurately indicates representative amount and direction of slope after a one-step process of placing the putting aid on the ground.

Still another object of the present invention is to provide a putting aid which includes a base with a referenced concave surface and a movable indicator.

Still another object of the present invention is to provide a putting aid which includes a base with a concave surface, at least one reference positioned relative to the concave surface, and an indicator movably associated with the concave surface relative to the reference.

Still another object of the present invention is to provide a putting aid which includes a base with a concave surface, a pair of highly visible sighting rods, a plurality of reference indicia located on the concave surface, and a spherical ball indicator for rolling upon the concave surface.

Still another object of the present invention is to provide a putting aid which includes a movable indicator and a unitary base including a pair of highly visible sighting rods extending upward from a rim peripherally surrounding a concave center portion.

Still another object of the present invention is to provide a method for facilitating the training of a golfer to putt a golf ball into a golf hole on a sloped green.

Still another object of the present invention is to provide a method for facilitating the training of a golfer to putt a golf ball into a golf hole on a sloped green which includes placing a putting aid on the ground at a point between the golf ball and the golf hole.

Still another object of the present invention is to provide a method for facilitating the training of a golfer to putt a golf ball into a golf hole on a sloped green which includes placing a putting aid on the ground at a point between the golf ball and the golf hole while aligning references on the putting aid with an imaginary line between the golf ball and the golf hole.

Still another object of the present invention is to provide a method for facilitating the training of a golfer to correctly perceive slope at a test location upon a sloped green.

Still another object of the present invention is to provide a method for facilitating the training of a golfer to correctly perceive slope at a test location upon a sloped green which includes placing a putting aid with a concave base and sighting rods upon a sloped green aligned, with the aid of the sighting rods, with a perceived downhill direction and then releasing a movable indicator upon the concave base to indicate actual downhill direction.

Still another object of the present invention is to provide a method for facilitating the mapping of slopes on a sloped green.

Still other objects, features and advantages of the present invention will become apparent upon reading and understanding the present specification, when taken in conjunction with the accompanying drawings.

DETAILED DESCRIPTION OF THE DRAWINGS

Figure 1:
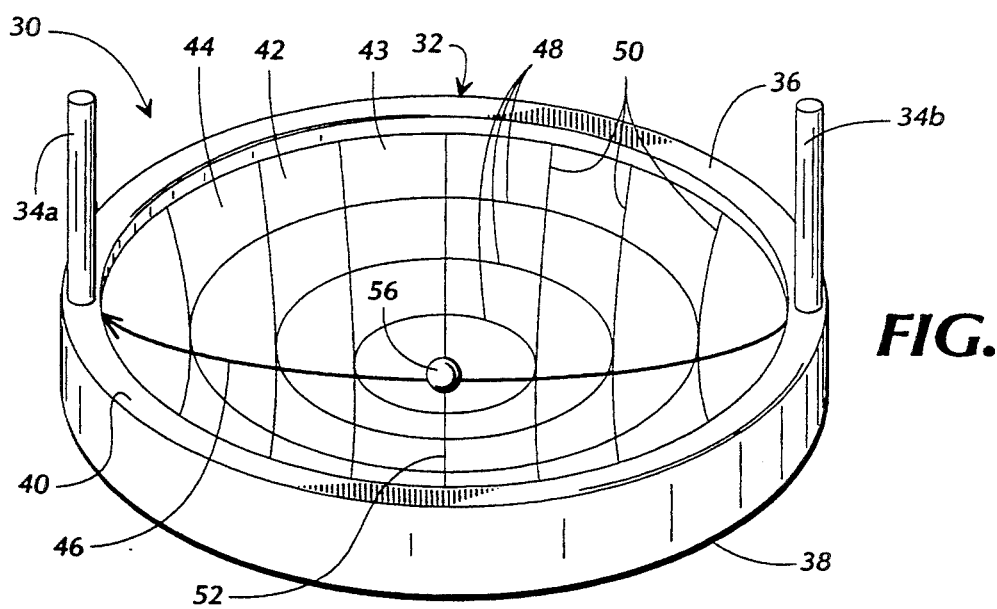
FIG. 1 is a side perspective view of the putting aid in accordance with the preferred embodiment of the present invention.
Figure 2:
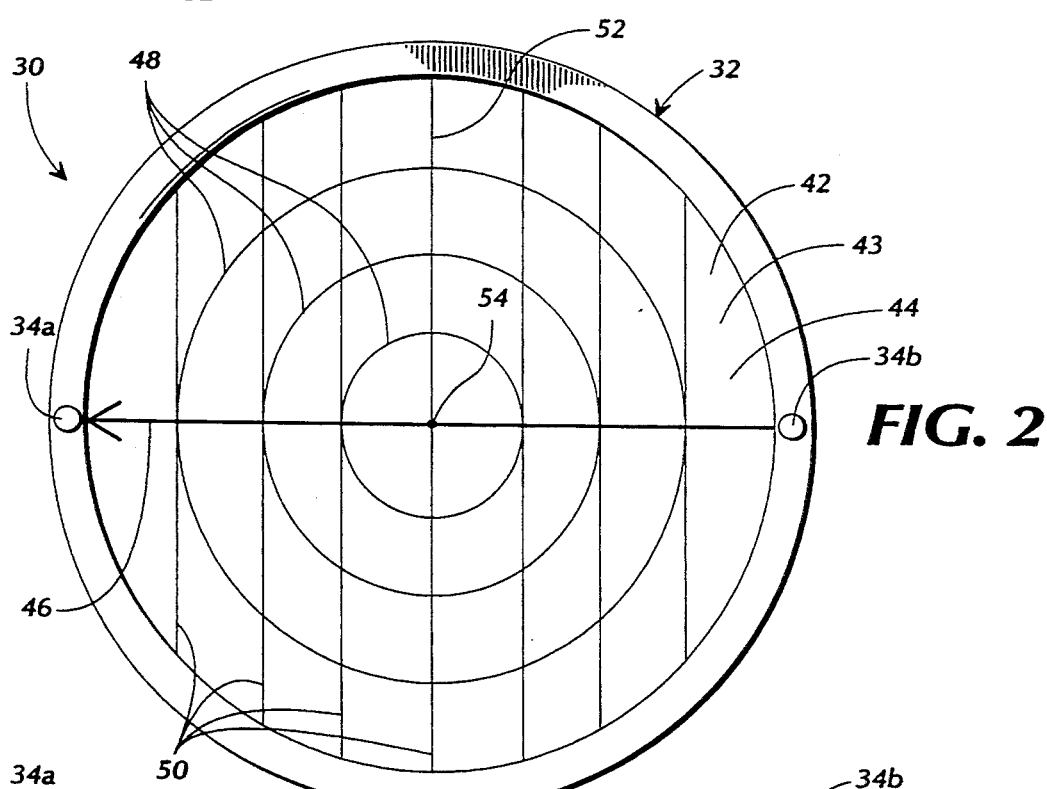
FIG. 2 is a top view of the putting aid base of FIG. 1.
Figure 3:
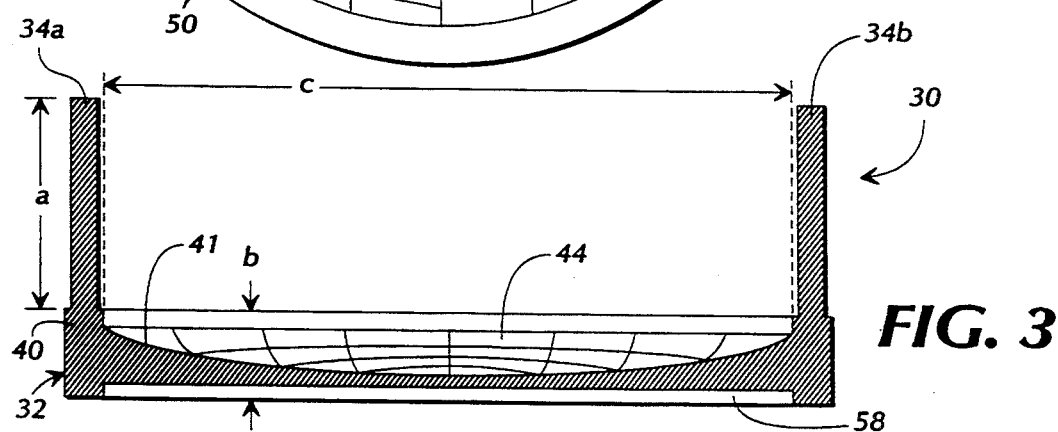
FIG. 3 is side cross-sectional view of the putting aid base of FIG. 1.

Referring now in greater detail to the drawings, in which like numerals represent like components throughout the several views, FIG. 1 displays a side perspective view of a putting aid 30 constructed in accordance with the preferred embodiment of the present invention. Refer also to FIGS. 2 and 3 which show top and side cross-sectional views of the putting aid 30 of FIG. 1. The putting aid 30 is shown including a unitary base 32 and a movable indicator 56. The base 32 includes a pair of diametrically opposed sighting rods 34a and 34b extending upward from a top 36 of a rim 40 peripherally surrounding a center portion 42. The center portion 42 includes a concave surface 43 forming the floor of a concave cavity 44 having a cavity bottom point 54 located at the center of the concave surface 43, also corresponding to the lowest point in the concave cavity 44 when the top 36 is horizontally level.

The concave surface 43 is preferably smooth and marked with a plurality of reference indicia 46, 48, and 50. An arrow indicium 46 extends as an arrowheaded line across the concave surface 43 through the cavity bottom point 54 pointing from the sighting rod 34b to the sighting rod 34a. Circular indicia 48 include a plurality of concentric circles centered upon the cavity bottom point 54. Transverse linear indicia 50 include a plurality of parallel lines perpendicularly intersecting the arrow indicium 46. One line of the transverse linear indicium 50 is shown as a middle transverse indicium 52 which passes through the cavity bottom point 54. With the exception of the middle transverse indicium 52, the remaining transverse linear indicia 50 preferably intersect the arrow indicium 46 at points where the circular indicia 48 intersect the arrow indicium 46. The center portion 42 also includes a bottom 38 defining a disk-shaped bottom cavity 58 for receiving portions of ground or grass during use to increase stability and accuracy.

Figure 4:
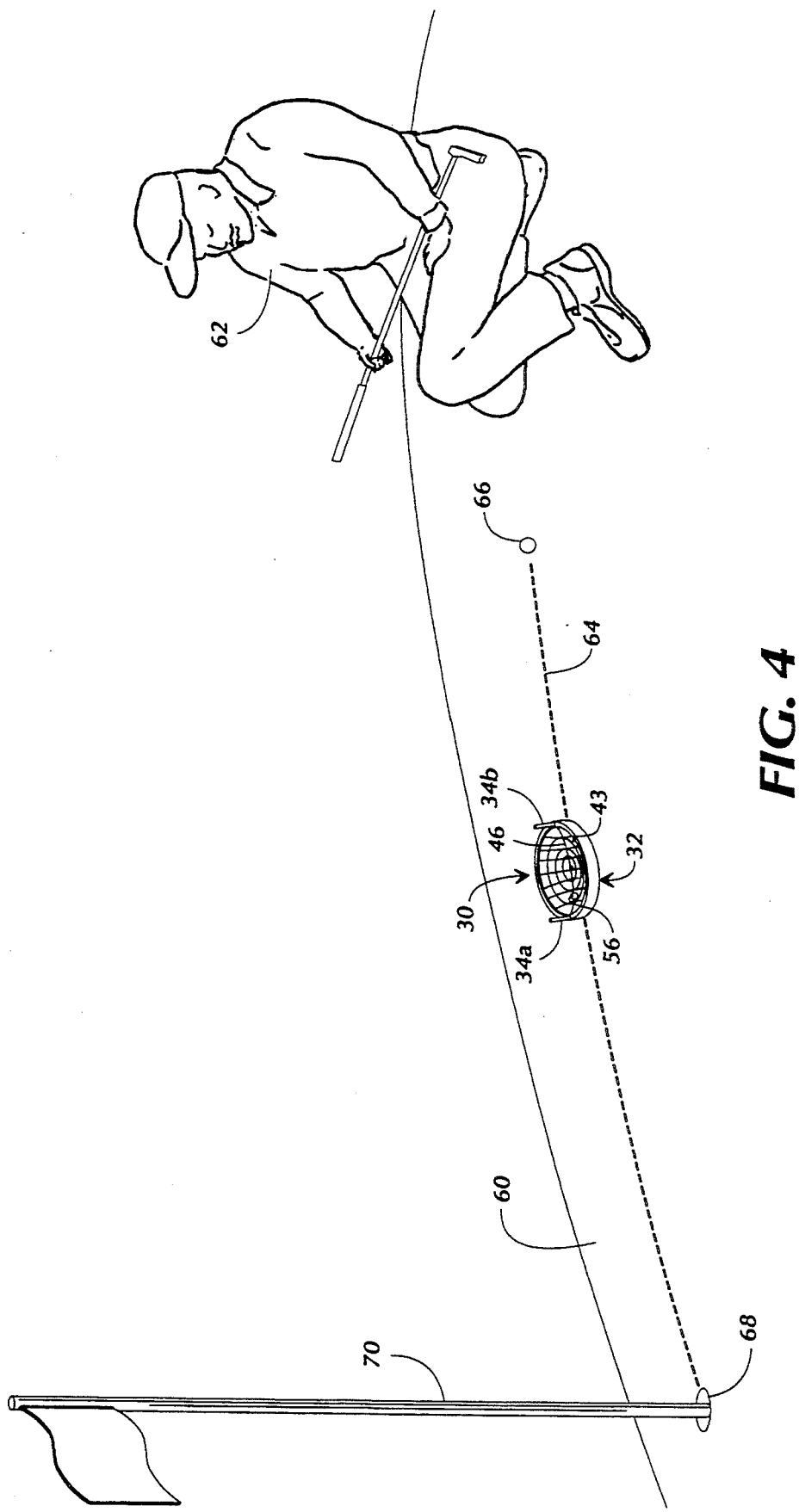
FIG. 4 is a perspective view of the putting aid of FIG. 1 shown in operation on a golf green in accordance with the first preferred method of the present invention.

FIG. 4 is a perspective view of the putting aid 30 shown in operation upon a sloped golf green 60 in accordance with a first preferred method of the present invention. The putting aid 30 is shown having been positioned by a golfer 62 at a point along an imaginary direct line 64 between a golf ball 66 and a golf hole 68 which is shown supporting a golf pin 70. According to this first method of the present invention, the operation of the putting aid 30 facilitates the training of the golfer 62 to putt the golf ball 66 into the golf hole 68. While placing the putting aid 30 upon the sloped golf green 60, the golfer 62 rotates the putting aid 30 until the arrow indicium 46 points from the golf ball 66 toward the golf hole 68. The golfer 62 may easily confirm the alignment by stepping away from the putting aid 30 and observing the readily visible sighting rods 34a, b to ensure that the putting aid 30 is indeed aligned with the imaginary direct line 64 extending between the golf ball 66 and the golf hole 68.

Depending on the choice of the golfer 62, during placement of the base 32, the movable indicator 56 may either be retained by the golfer 62 or allowed to roll upon the concave surface 43. If the movable indicator 56 is retained, the golfer 62 places the movable indicator 56 upon the concave surface 43 after the base 32 is properly positioned, as explained above. Under the force of gravity, the movable indicator 56 will roll around the concave surface 43 until reaching a final resting position. After the putting aid 30 is properly positioned and aligned, as explained above, and the movable indicator 56 is allowed to roll about the concave surface 43, the golfer 62 is ready to observe the final resting position of the movable indicator 56.

The observable relationships between the final position of the movable indicator 56 and the plurality of reference indicia 46, 48, 50, 52 and 54 (FIG. 2) located upon the concave surface 43 provide the golfer 62 with valuable information. First, the relationship between the final resting position of the movable indicator 56 and the cavity bottom point 54 indicates the exact representative direction of the downward slope of the sloped golf green 60. Second, each component of the downward direction of the slope at the point of the putting aid 30 can be determined from the relationship between the final resting position of the movable indicator 56 and the arrow indicium 46 and the middle transverse indicium 52. In other words, from the perspective of the golfer 62, if the movable indicator 56 is, as is shown in FIG. 4, located on the left side of the arrow indicium 46 and the away side of the middle transverse indicium 52, the downward slope is directed toward the left and away from the golfer 62. Likewise, if the movable indicator 56 were located on the right side of the arrow indicium 46, the direction of the downward slope would be toward the right, and the direction of the downward slope would be toward the golfer 62 if the movable indicator 56 were finally located on the near side of the middle transverse indicium 52.

In addition to downward slope direction, the golfer 62 is also able to determine the amount of downward slope at the location of the putting aid 30. The distance away from the arrow indicium 46 determines how much the golf ball 66 would curve if hit directly toward the golf hole 68. Thus, this distance also tells the golfer 62 how much the putting stroke should be compensated in the opposite direction. The relationship between the movable indicator 56 and the transverse linear indicia 50 help the golfer 62 determine how much force should be applied to the golf ball 66 during the putt since the relationship provides an indication of how far uphill or downhill the golf hole 68 lies from the golf ball 66. While the linear indicia 46 and 50 provide a Cartesian coordinate reference to the movable indicator 56, the circular indicia 48 indicate a polar radial coordinate relationship which can be used by the golfer 62 to quickly and more precisely determine the amount of downward slope as a combination of both left/right and away/near components.

Clearly, depending on the length of the putt and the terrain of the sloped golf green 60, this first method may need to be repeated several times along the imaginary direct line 64 between the golf ball 66 and the golf hole 68 if the slope of the sloped golf green 60 changes between the golf ball 66 and the golf hole 68. Because of the simplicity and ease of use of the putting aid 30, this process includes simply shifting the putting aid 30 toward or away from the golf hole 68.

Figure 5:
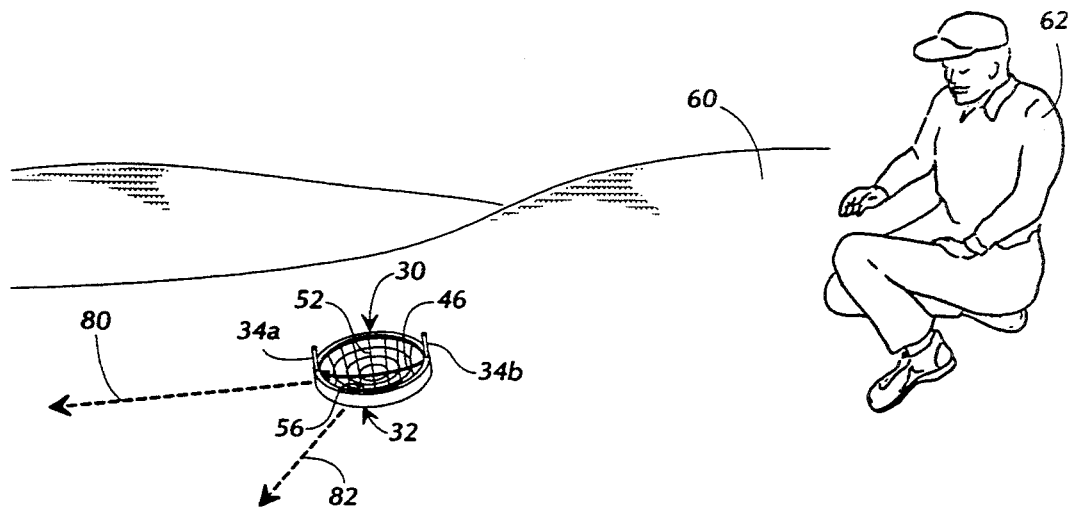
FIG. 5 is a perspective view of the putting aid of FIG. 1 shown in operation on a golf green in accordance with the second preferred method of the present invention.

FIG. 5 is a perspective view of the putting aid 30 shown in operation on a sloped golf green 60 in accordance with the second preferred method of the present invention. According to this second method, the putting aid 30 facilitates the training of the golfer 62 to correctly perceive slope at a test location. The putting aid 30 is shown having been positioned at a test location with the arrow indicium 46 and sighting rods 34a,b aligned with a perceived downward (downhill) slope direction 80. According to the first step of the method, the golfer 62 retains the movable indicator 56 and places and aligns only the base 32 of the putting aid 30 upon the sloped golf green 60. In retaining the movable indicator 56, the golfer 62 may either, depending on the golfer's choice, hold the movable indicator 56 separate from the base 32, such as in a hand or a pocket, or the golfer 62 may hold the movable indicator 56 still upon the base 32 while the base 32 is positioned and aligned on the sloped golf green 60. By providing the golfer 62 a way to restrain the movable indicator 56 from rolling around during this first part of the method, the learning process is enhanced by allowing the golfer 62 to make his or her guess without the movable indicator 56 prejudicing the golfer's opinion as the putting aid 30 is placed upon the sloped golf green 60.

As the movable indicator 56 is eventually released upon the base 32, the actual downward slope direction 82 is indicated by the relationship between the final resting position of the movable indicator 56 and the cavity bottom point 54. The golfer 62 is readily able to determine how far away the perceived downward slope direction 80 is from the actual downward slope direction 82. If the final resting position of the movable indicator 56 is behind the middle transverse indicium 52, the perceived downward slope direction 80 was backwards, and if the final resting position of the movable indicator 56 is off to either side of the arrow indicium 46, the direction and amount of left/right deviation from the actual downward slope direction 82 is readily observable. Furthermore, the golfer 62 is also able to see an indication of the actual amount of downward slope at the test location so that such an indication can be compared to any earlier mental approximation of the amount of slope.

Figure 6:
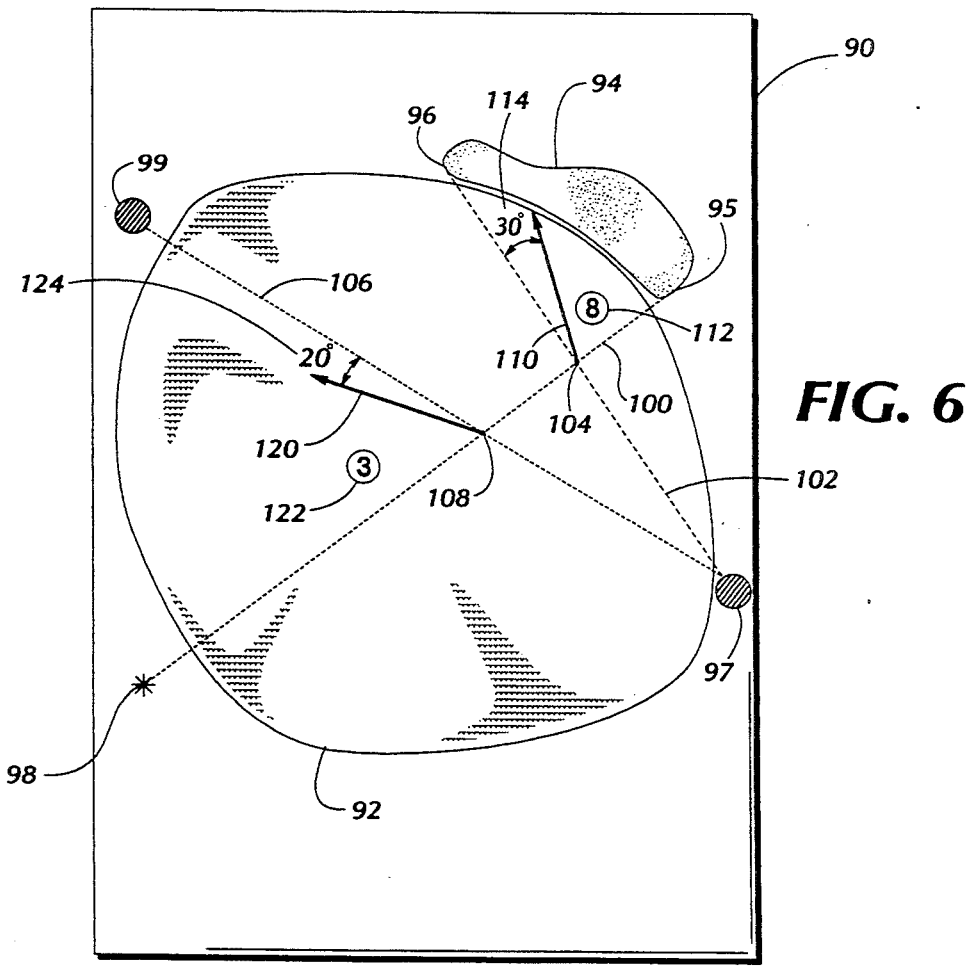
FIG. 6 is a plan view of a sample map of a golf green marked according to the third method of the present invention.

FIG. 6 is a plan view of a sample map 90 of a sloped golf green 60 (refer to FIGS. 2 and 4 for elements not shown in FIG. 6) marked according to the third method of the present invention. According to this third method, the putting aid 30 facilitates the mapping of slopes on a sloped golf green 60. A golfer 62 begins by drawing (or obtaining if available) a basic golf green outline 92 corresponding to the shape of a particular sloped golf green 60. Next, if not already provided, the golfer 62 draws several symbols representing physical objects around the sloped golf green 60, such as tree symbols 97, 99, a bunker symbol 94 with bunker symbol ends 95, 96, and a sprinkler head symbol 98. Subsequently, the golfer 62 operates the putting aid 30 in various sample locations throughout the sloped golf green 60 to record direction and amount of slope at each of those locations.

To determine a sample location, the golfer 62 preferably finds an intersection between lines of sight between four physical objects around the sloped golf green 60, drawing the lines of sight and additional object symbols on the map 90 as necessary. For example, a first line of sight 100 is shown extending between the bunker symbol end 95 and the sprinkler head symbol 98, and a second line of sight 102 is shown extending between the bunker symbol end 96 and the tree symbol 97. Thus, a first sample location 104 is established at the intersection of line of sight 100 and line of sight 102. The putting aid 30 is then placed down upon the sloped golf green 60 at the first sample location 104 with the arrow indicium 46 pointing along a line of sight in the direction which is most downhill from the first sample location 104, such as the direction represented by the line of sight 102 toward the bunker symbol end 96. The sighting rods 34a,b are particularly useful at this point in aligning the putting aid 30 with a line of sight.

By observing the final resting position of the movable indicator 56 with respect to the cavity bottom point 54 and various indicia 46, 48, 50, 52, the golfer 62 is able to determine and record the representative direction and amount of downward slope at that particular location. One example of a recording technique includes drawing a slope direction marking 110 representative of an actual downward slope direction, a relative slope amount marking 112, and a slope angle marking 114. As discussed above, the circular indicia 48 clearly indicate the total relative amount of downward slope in any particular direction. The golfer 62 is easily able to subdivide each circular indicium 48, such as into multiples of 5 as evidenced in example measurements of "3" and "8" in FIG. 6, to achieve greater measurement resolution. Furthermore, the golfer 62 is also able to estimate and record the angular component of direction from the chosen reference direction of the arrow indicium 46 as indicated by the slope angle marking 114. In other words, if the final resting position of the movable indicator 56 appears to be approximately 30 degrees from the arrow indicium 46, the actual downward slope direction is approximately 30 degrees from the reference direction, such as toward the bunker symbol end 96 from the first sample location 104. Subsequently, additional sample locations, such as a second sample location 108, are similarly determined and evaluated. By finding one additional physical object, such as represented by the tree symbol 99, the golfer 62 easily locates the second sample location 108 at the intersection of a third line of sight 106 with the line of sight 100 (otherwise, two additional physical objects could be located and utilized to determine another independent line of sight). By similarly orienting and aligning the putting aid 30 along the most downhill line of sight, with the important aid of the sighting rods 34a,b, and then observing the movable indicator 56, the golfer 62 is able to determine direction and amount of slope to record a slope direction marking 120, a relative slope amount marking 122, and a slope angle marking 124.

It is intended that the scope of the present invention also include various alternate embodiments. Nevertheless, it should be understood that the each of the embodiments disclosed herein, including the preferred embodiment, includes features and characteristics which are considered independently inventive. Accordingly, the disclosure of variations and alterations expressed in alternate embodiments is intended only to reflect on the breadth of the scope of the present invention without suggesting that any of the specific features and characteristics of the preferred embodiment are more obvious or less important.

Figure 7:
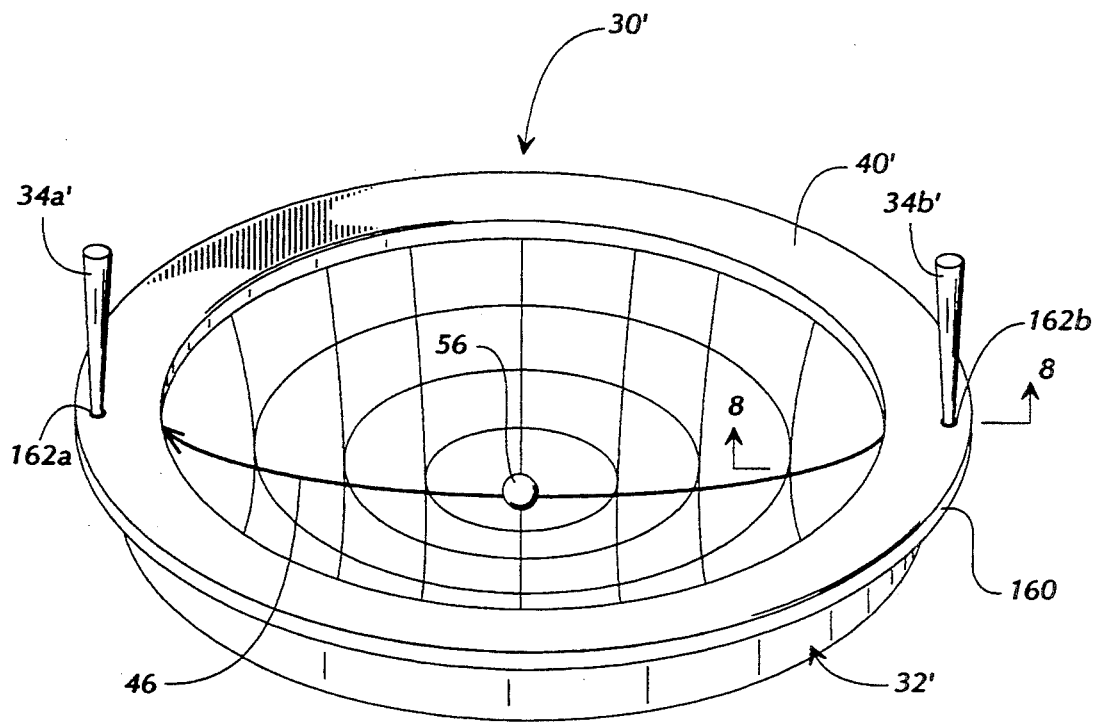
FIG. 7 is a side perspective view of a putting aid in accordance with a first alternate embodiment of the present invention.
Figure 8:
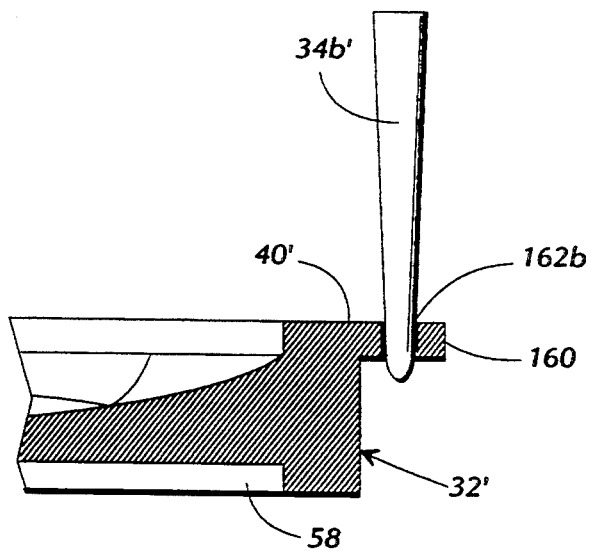
FIG. 8 is a partial side cross-sectional view of the putting aid base of FIG. 7 taken along lines 8—8 of FIG. 7.

In accordance with a first alternate embodiment of the present invention, FIG. 7 shows a side perspective view of a putting aid 30', and FIG. 8 shows a partial side cross-sectional view taken along lines 8—8 of FIG. 7. The putting aid 30'0 of this first alternate embodiment of the present invention is substantially similar to the putting aid 30 of the preferred embodiment of the present invention and capable of similar operation. However, differences include an alternately-shaped rim 40' and alternately-shaped sighting rods 34a'b'. The rim 40' includes a lip 160 that extends around the periphery of the rim 40'. In addition, tapered rod openings 162a and 162b extend through the lip 160 at diametrically opposed positions along arrow indicium 46. The sighting rods 34a',b' are shown tapered and removably located in the tapered rod openings 162a,b, thus the sighting rods 34 a',b' are able to be removed for storage to render the putting aid 30' more compact and functional with other alternately-sized and alternately-shaped sighting rods.

Figure 9:
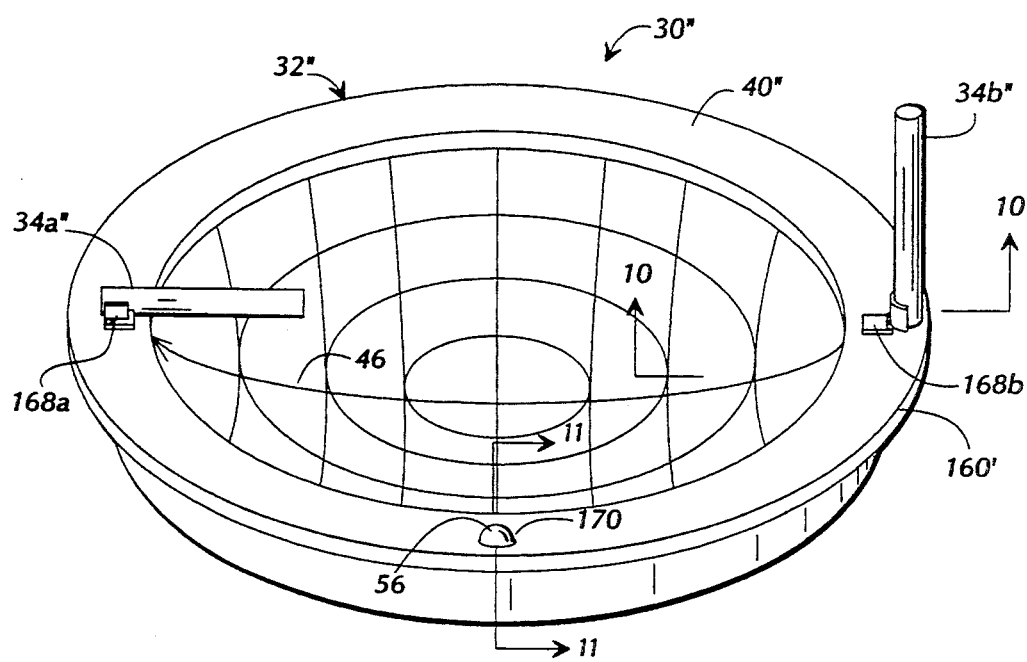
FIG. 9 is a side perspective view of a putting aid in accordance with a second alternate embodiment of the present invention.
Figure 10:
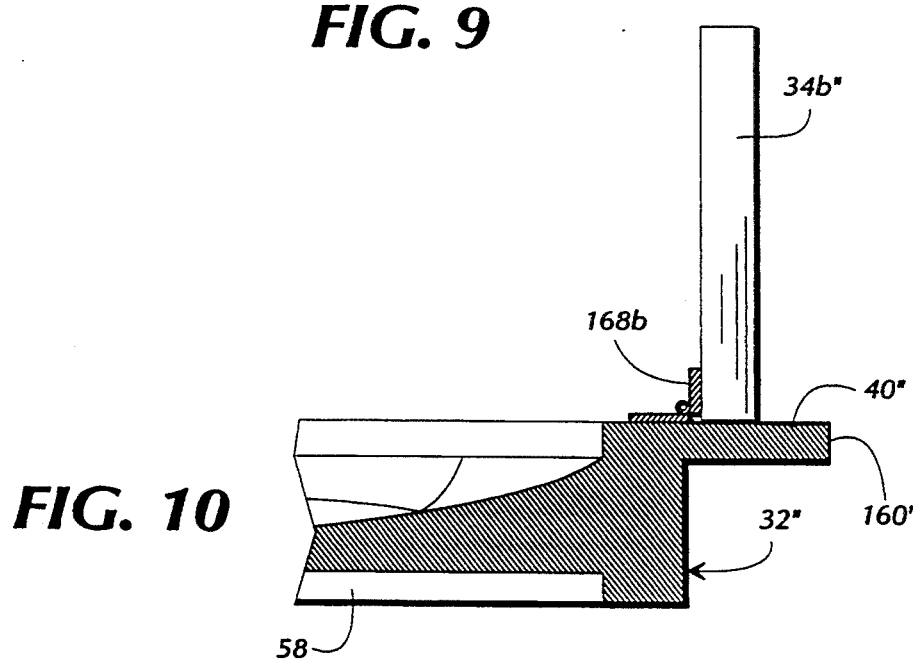
FIG. 10 is a partial side cross-sectional view of the putting aid base of FIG. 9 taken along lines 10—10 of FIG. 9.
Figure 11:
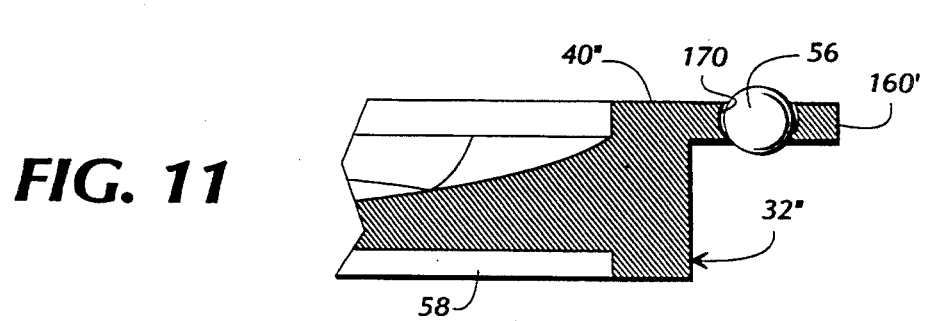
FIG. 11 is a partial side cross-sectional view of the putting aid base of FIG. 9 taken along lines 11—11 of FIG. 9.

In accordance with a second alternate embodiment of the present invention, FIG. 9 shows a side perspective view of a putting aid 30", and FIGS. 10 and 11 show partial side cross-sectional views taken along lines 10—10 and 11—11 of FIG. 9, respectively. The putting aid 30" is also substantially similar in form and function to the preferred embodiment, except for an alternately shaped rim 40" and alternately formed and connected sighting rods 34a",b". The sighting rods 34a"b" are shown hingeably connected to the rim 40" through hinges 168a,b which allow the sighting rods 34a",b" to selectively pivot inward and upward for storage and operation, respectively. Furthermore, the rim 40" defines a retention cavity 170 for storing the movable indicator 56 to reduce any chance that the movable indicator 56 may become lost or misplaced. The retention cavity 170 is shown with concave side walls for releasably holding the movable indicator 56 in a pressure-fit manner.

In accordance with the preferred embodiment of the present invention, with reference to FIG. 3, the height of the sighting rods 34a,b, shown by dimension "a", has an acceptable value within the range of ¼ to 20 inches (0.635 cm to 50.8 cm), while preferably being between 2 and 6 inches (5.08 cm to 15.24 cm). Similarly, the height of the center portion 42, shown by dimension "b", has an acceptable value within the range of ¼ to 4 inches (0.635 cm to 10.16 cm), while preferably being between ¾ and 2 inches (1.905 cm and 5.08 cm). The diameter of the cavity 42, shown by dimension "c", has an acceptable value within the range of 1 to 36 inches (2.54 cm to 91.44 cm), while preferably being between 6 and 18 inches (15.24 cm and 45.72 cm). In addition, the putting aid 30 is constructed of a relatively rigid material, with plastic being one acceptable example.

While the embodiments of the present invention which have been disclosed herein are the preferred forms, other embodiments of the apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative dimensions and relationships shown on the drawings are given as example relative dimensions and relationships, thus the scope of the invention is not to be limited thereby.

I claim:

1. A method of facilitating the training of a golfer to putt a golf ball from a first location into a golf hole on a sloped golf green, said method comprising the steps of:
   providing a putting aid including a base, a concave upper surface, a movable indicator on said upper surface, and means defining a straight sighting line passing through the center of said concave surface; and
   placing the putting aid upon the sloped golf green at a point between the golf ball at the first location and the golf hole, with said sighting line directed toward said golf hole; and observing the resting location of the movable indicator on said upper surface relative said sighting line.

2. The method of claim 1,
   wherein the putting aid further includes a rim peripherally encircling the concave surface and a pair of sighting rods extending upward from diametrically opposing positions on the rim, and
   wherein the placing step includes rotating the putting aid until the pair of sighting rods are aligned with an imaginary direct line between the golf hole and the golf ball at the first location.

3. The method of claim 1,
   wherein the putting aid further includes an arrow indicium extending across the concave surface through a bottom point of the concave surface, and
   wherein the placing step includes the step of rotating the putting aid until the arrow indicium points toward the golf hole from the golf ball at the first location.

4. The method of claim 1,
   wherein the putting aid further includes a plurality of concentric circular indicia centered on a bottom point of the concave surface and a pair of perpendicular linear indicia extending across the concave surface through the bottom point of the concave surface where the linear indicia cross each other, and
   wherein the placing step includes the step of rotating the putting aid until a first linear indicium of the pair of linear indicia is aligned with an imaginary direct line between the golf hole and the golf ball at the first location and a second linear indicium of the pair of linear indicia is perpendicular to the imaginary direct line between the golf hole and the golf ball at the first location, whereby relationships between a resting position of the movable indicator and the circular and linear indicia of the base are readily determinable for modifying putting direction and speed.

5. The method of claim 1, wherein the placing step includes the steps of
   orienting the base of the putting aid upon the golf green at a location between the golf ball at the first location and the golf hole; and
   depositing the movable indicator onto the concave surface after the base is resting upon the golf green.

6. A method of facilitating the training of a golfer to correctly perceive slope at a test location on a sloped golf green, said method comprising the steps of:
   providing a putting aid including a base and a movable indicator, wherein the base includes a concave surface and a reference positioned relative to the concave surface;
   placing the base of the putting aid down upon the sloped golf green at the test location on the sloped golf green;
   rotating the base of the putting aid to align the reference with a perceived downhill direction while placing the base of the putting aid down upon the sloped golf green;
   restraining the movable indicator while placing the base of the putting aid down upon the sloped golf green; and
   releasing the movable indicator to move about the concave surface and indicate an actual downhill direction in relation to the reference indicating the perceived downhill direction.

7. The method of claim 6,
   wherein the placing step includes placing only the base of the putting aid down upon the sloped golf green, and
   wherein the releasing step includes depositing the movable indicator onto the concave surface.

8. The method of claim 6,
   wherein the putting aid further includes an arrow indicium extending across the concave surface through a bottom point of the concave surface, and
   wherein the rotating step includes the step of rotating the putting aid until the arrow indicium points in the perceived downhill direction, whereby relationships between a resting position of the movable indicator, the bottom point of the concave surface, and the arrow indicium of the base are readily determinable for comparing the perceived downhill direction with the actual downhill direction.

9. The method of claim 6,
   wherein the putting aid further includes a pair of perpendicular linear indicia extending across the concave surface through the bottom point of the concave surface where the pair of perpendicular linear indicia cross each other, and
   wherein the rotating step includes the step of rotating the putting aid until a first linear indicium of the pair of linear indicia is aligned with the perceived downhill direction and a second linear indicium of the pair of linear indicia is perpendicular to the perceived downhill direction, whereby relationships between a resting position of the movable indicator, the bottom point of the concave surface, and the pair of perpendicular linear indicia are readily determinable for comparing the perceived downhill direction with the actual downhill direction.

10. The method of claim 6,
    wherein the putting aid further includes a plurality of concentric circular indicia centered on a bottom point of the concave surface, whereby relationships between a resting position of the movable indicator and the plurality of concentric circular indicia are readily determinable for comparing a perceived amount of downhill slope with an actual amount of downhill slope.

11. The method of claim 6,
wherein the putting aid further includes a rim peripherally encircling the concave surface and a pair of sighting rods extending upward from diametrically opposing positions on the rim, and wherein the rotating step includes rotating the putting aid until the pair of sighting rods are aligned with the perceived downhill direction.

* * * * *